United States Patent Office 2,982,445
Patented May 2, 1961

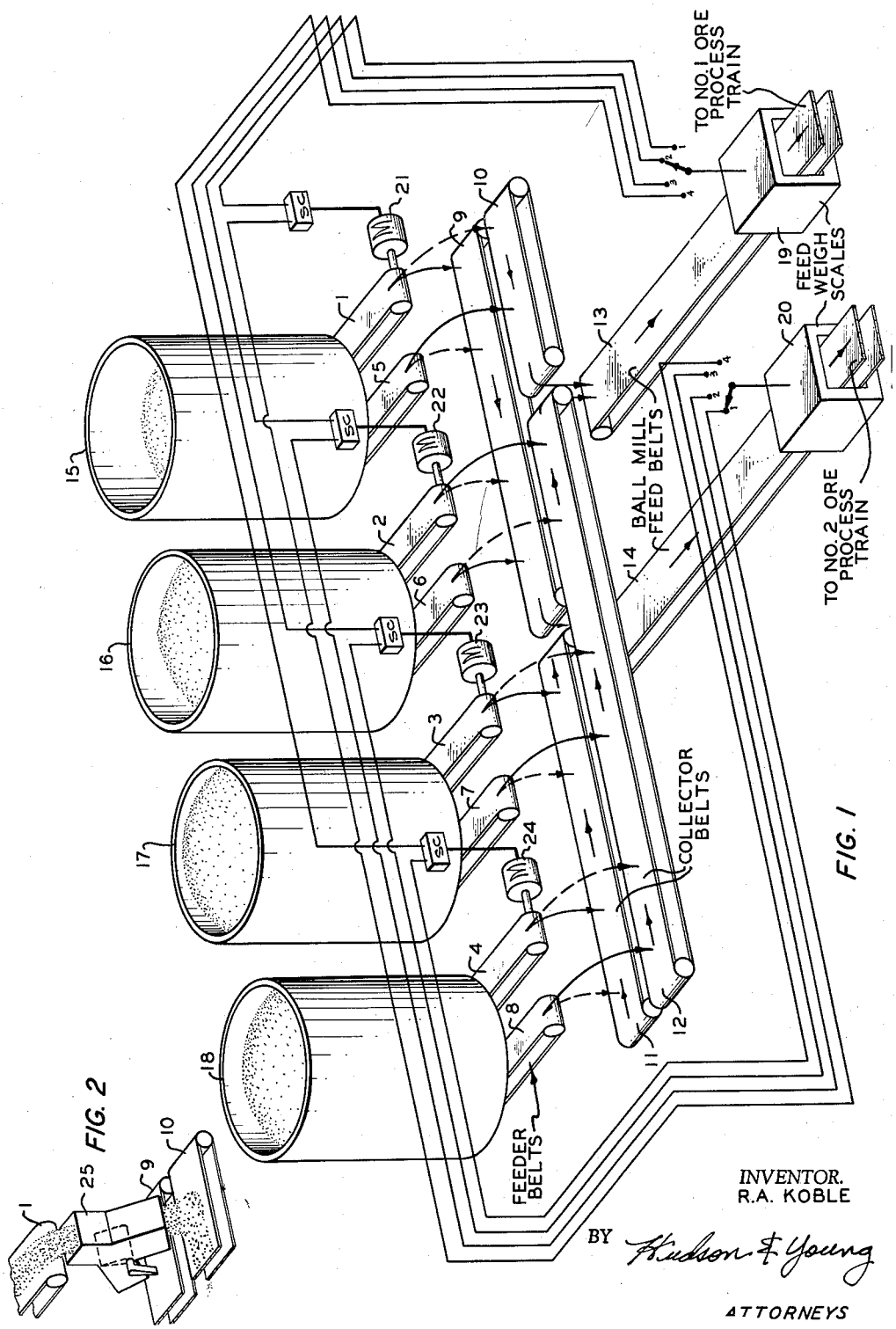

2,982,445

APPARATUS FOR FEEDING SOLIDS

Robert A. Koble, Bartlesville, Okla., assignor to Phillips Petroleum Company, a corporation of Delaware Filed Aug. 28, 1958, Ser. No. 757,722

6 Claims. (Cl. 222—55)

This invention relates to apparatus for feeding of solids. In one aspect, invention relates to apparatus for feeding solids from a plurality of storage zones to one or more points of utility at a constant rate.

In many processes, solids are gathered from a plurality of storage zones such that the composition, size, or other properties may vary somewhat from one such zone to another. In other instances, the amount of material accumulated may vary from zone to zone. In either case, it is often desirable to draw material from two or more zones to one point of utility. This is often the case in milling or beneficiation operations where a battery of hoppers supplies two or more parallel material processing trains.

It is an object of this invention to provide an improved arrangement of apparatus for feeding solids simultaneously from a plurality of storage zones to at least one conveying zone at a constant, controlled rate. Another object of the invention is to provide such an arrangement of apparatus having two or more conveyor zones feeding to a point of utility. Another object of the invention is to provide such apparatus having great flexibility in operation. Other objects, as well as aspects and advantages, of the invention will become apparent from a study of the accompanying disclosure and drawing.

According to the invention there is provided an apparatus comprising a plurality of storage vessels, each containing at least one constant-speed dispensing conveyor and at least one variable-speed dispensing conveyor to convey solids to at least one down stream or utility conveyor, means for automatically weighing solids being conveyed by said utility conveyor, and means operatively connected with said weighing means for controlling the rate of said variable-speed dispensing conveyor in response to the weight of solids being conveyed by said utility conveyor.

In a preferred embodiment of the invention there are at least two of said utility conveyors, and each dispensing conveyor is capable of feeding solids to either utility conveyor.

The invention will be better understood in connection with the description of a specific embodiment which is shown in the diagrammatic drawing of Figure 1 and Figure 2. Figure 1 shows an embodiment of the system of the invention, while Figure 2 shows the arrangement of the flop gate assembly and its association with the dispensing conveyors.

In a specific example of the invention each storage bin 15, 16, 17 and 18 contains finely ground uranium ore. Any other ore or solid material is, of course, applicable. Pioche-type belt feeders 1 through 8 are associated with the storage drums as shown. Conveyors 5, 6, 7 and 8 convey solids at a constant rate from storage bins 15, 16, 17 and 18, respectively. Drive means, not shown, are associated with each of these belts, as will be understood. Conveyor belts 1, 2, 3 and 4 convey solids from drums 15, 16, 17 and 18, respectively, and their speed is controlled by variable-speed motors 21, 22, 23 and 24, respectively, each of which has associated therewith a speed control mechanism, as shown. Each of the belts 1 through 8 discharges into a flop gate assembly 24, not shown in Figure 1, but shown in Figure 2. The flop gate assemblies are so arranged that belts 1 and 5 can be discharged by switching the gate manually either to belt 9 or belt 10, while belts 2 and 6 can be discharged either to belts 9 or 12, and belts 3 and 7, 4 and 8 can be discharged either to belt 11 or belt 12. Belts 13 and 14 are fed by the intermediate belts 9, 10, 11 and 12, belts 10 and 12 discharging onto belt 13 and belts 9 and 11 discharging onto belt 14. Associated with belts 13 and 14 are automatic weighing controllers 19 and 20, respectively. These weigh scales automatically weigh the ore on the belt and in response to a signal therefrom control the speed of one of the variable-speed dispensing conveyors in response to the weight of material being conveyed in order to maintain a constant flow of solids by conveyor 13 and by conveyor 14. This output signal from the automatic controlling weigh scales 19 and 20 can be connected by switches 1, 2, 3 and 4 to control the speed of one of the variable-speed dispensing conveyors. Thus, in the specific example shown in the drawing, the solid arrows indicate onto which belt each of the dispensing conveyors 1 through 8 are discharging. Weigh scale 19 is connected through switch 2 to variably control the speed of variable-speed motor 22. The variable speed motors run at constant speed unless connected by the means of one of the switches to the output from the weigh scales. As shown on the drawing the output from weigh scale 20 in this specific embodiment is connected at switch 1 to control the speed of variable-speed motor 21. Thus, in this embodiment as will be seen in the drawing conveyors 1 and 6 are discharging onto conveyor 9 and thence to utility conveyor 14, and conveyors 3 and 4 are discharging onto conveyor 11 and thence to utility conveyor 14. Thus, each of conveyors 3, 4 and 6 are running at constant speed, while conveyor 1 is running at a variable speed responsive to the signal from weight scale 20. Conveyor 5 is discharging onto conveyor 10 and thence to utility conveyor 13, while conveyors 2, 7 and 8 are discharging onto conveyor 12 and thence to utility conveyor 13. Conveyors 5, 7 and 8 are running at constant speed while conveyor 2 is running at variable speed in response to the signal from weigh scale 19.

In the specific example described in connection with the drawing the automatic controlling weigh scales 19 and 20 is an ABC weigh scale manufactured by McDowell Company, Inc., 1630 Waterloo Road, Cleveland, Ohio, and described in their catalog Bulletin 100A. The signal from the weigh scale is operatively connected to a Reeves varidrive to control the motor speed of motors 21, 22, 23 and 24. The Reeves varidrive is described in Bulletin N-575 of Reeves Pulley Company, Columbus, Indiana.

As will be evident to those skill in the art, various modifications of this invention can be made or followed in the light of the foregoing disclosure and discussion without departing from the spirit or scope of the disclosure or from the scope of the claims.

I claim:

1. Apparatus comprising a plurality of storage vessels, each storage vessel having at least one constant-speed dispensing conveyor and at least one variable-speed dispensing conveyor, each dispensing conveyor being operatively connected to convey solids from its respective storage vessel to a down stream or utility conveyor, weighing means for automatically weighing solids being conveyed by said utility conveyor; and means, adapted to maintain a constant rate of delivery of total solids to said utility conveyor, operatively connected with said weighing means for varying and controlling the rate of at least one of said variable-speed dispensing conveyors in response to a variation in the weight of combined solids being conveyed by said utility conveyor.

2. Apparatus comprising a plurality of storage vessels, each storage vessel having at least one constant-speed dispensing conveyor and at least one variable-speed dispensing conveyor, each dispensing conveyor being operatively connected to convey solids from its respective storage vessel to each of at least two utility conveyors; separate weighing means for each utility conveyor for automatically weighing solids being conveyed by said utility conveyors; and separate means, adapted to maintain a constant rate of delivery of total solids to each of said separate utility conveyors, operatively connected with each of said separate weighing means for varying and controlling the rate of at least one of said variable-speed dispensing conveyors feeding solids to each of said operatively connected utility conveyors in response to a variation in the weight of combined solids being conveyed by each of said utility conveyors.

3. Apparatus of claim 2 wherein each of said dispensing conveyors are endless conveyor belts and each of said utility conveyors are endless conveyor belts.

4. Apparatus comprising a plurality of storage vessels, each storage vessel having at least one constant-speed dispensing conveyor and at least one variable-speed dispensing conveyor, each dispensing conveyor being operatively connected to convey solids from its respective storage vessel to each of at least two utility conveyors, each of said dispensing conveyors and each of said utility conveyors are endless conveyor belts; a plurality of intermediate conveyor belts interposed between said dispensing conveyor belts and said utility conveyor belts, at least one of said intermediate conveyor belts being associated with each utility conveyor belt for discharging solids thereto, each of said dispensing conveyor belts being arranged so as to separately discharge solids to any of said intermediate conveyor belts; separate weighing means for each utility conveyor for automatically weighing solids being conveyed by said utility conveyors; and separate means, adapted to maintain the constant rate of delivery of total solids to each of said separate utility conveyors, operatively connected with each of said separate weighing means for varying and controlling the rate of at least one of said variable-speed dispensing conveyors feeding solids to each of said operatively connected utility conveyors in response to a variation in the weight of combined solids being conveyed by each of said utility conveyors.

5. Apparatus comprising a plurality of storage vessels, each storage vessel having at least one constant-speed dispensing conveyor and at least one variable-speed dispensing conveyor, each dispensing conveyor being operatively connected to convey solids from its respective storage vessel to each of at least two utility conveyors, each of said dispensing conveyors and each of said utility conveyors are endless conveyor belts; a plurality of intermediate conveyor belts interposed between said dispensing conveyor, each dispensing conveyor being operatively connected to convey solids from its respective storage vessel to each of at least two utility conveyors; a plurality of intermediate conveyor belts interposed between said dispensing conveyor, each dispensing conveyor being operatively connected to convey solids from its respective storage vessel to each of at least two utility conveyors; a plurality of intermediate conveyor belts interposed between said dispensing conveyor, each dispensing conveyor being operatively connected to convey solids from its respective storage vessel to each of at least two utility conveyors; a plurality of intermediate conveyor belts interposed between said dispensing conveyor, each dispensing conveyor being operatively connected to convey solids from its respective storage vessel to each of at least two utility conveyors; a plurality of intermediate conveyor belts interposed between said dispensing conveyor belts, each dispensing conveyor belts being associated with each utility conveyor belt for discharging solids thereto, each of said dispensing conveyor belts being arranged so as to separately discharge solids to any of said intermediate conveyor belts; each of said dispensing conveyor belts discharging into a valved hopper having a plurality of exit ports for discharging onto a plurality of said intermediate conveyor belts; and separate means, adapted to maintain a constant rate of delivery of total solids to each of said separate utility conveyors, operatively connected with each of said separate weighing means for varying and controlling the rate of at least one of said variable-speed dispensing conveyors feeding solids to each of said operatively connected utility conveyors in response to a variation in the weight of combined solids being conveyed by each of said utility conveyors.

6. Apparatus comprising a plurality of storage vessels, each vessel having a variable-speed dispensing conveyor, each dispensing conveyor being operatively connected to convey solids from its respective storage vessel to each of at least two utility conveyors; a plurality of intermediate conveyors interposed between said dispensing conveyors and said utility conveyors, at least one of said intermediate conveyors being associated with each utility conveyor for discharging solids thereto, each of said dispensing conveyors being arranged so as to separately discharge solids to any of said intermediate conveyors; separate weighing means for each utility conveyor for automatically weighing solids being conveyed by said utility conveyors; and separate means, adapted to maintain the constant rate of delivery of total solids to each of said separate utility conveyors, operatively connected with each of said separate weighing means for varying and controlling the rate of at least one of said variable-speed dispensing conveyors feeding solids to each of said operatively connected utility conveyors in response to a variation in the weight of combined solids being conveyed by each of said utility conveyors.

References Cited in the file of this patent

UNITED STATES PATENTS

| | | |
|---|---|---|
| 1,922,883 | Crago | Aug. 15, 1933 |
| 2,510,158 | Van Ackern | June 6, 1950 |
| 2,708,503 | Arnold | May 17, 1955 |

UNITED STATES PATENT OFFICE
CERTIFICATE OF CORRECTION

Patent No. 2,982,445                        May 2, 1961

Robert A. Koble

It is hereby certified that error appears in the above numbered patent requiring correction and that the said Letters Patent should read as corrected below.

Column 4, line 6, for ", each dispensing conveyor being oper-" read -- belts and said utility conveyor belts, at --.

Signed and sealed this 7th day of November 1961.

(SEAL)
Attest:

ERNEST W. SWIDER                      DAVID L. LADD
Attesting Officer                        Commissioner of Patents

USCOMM-DC